Patented June 16, 1936

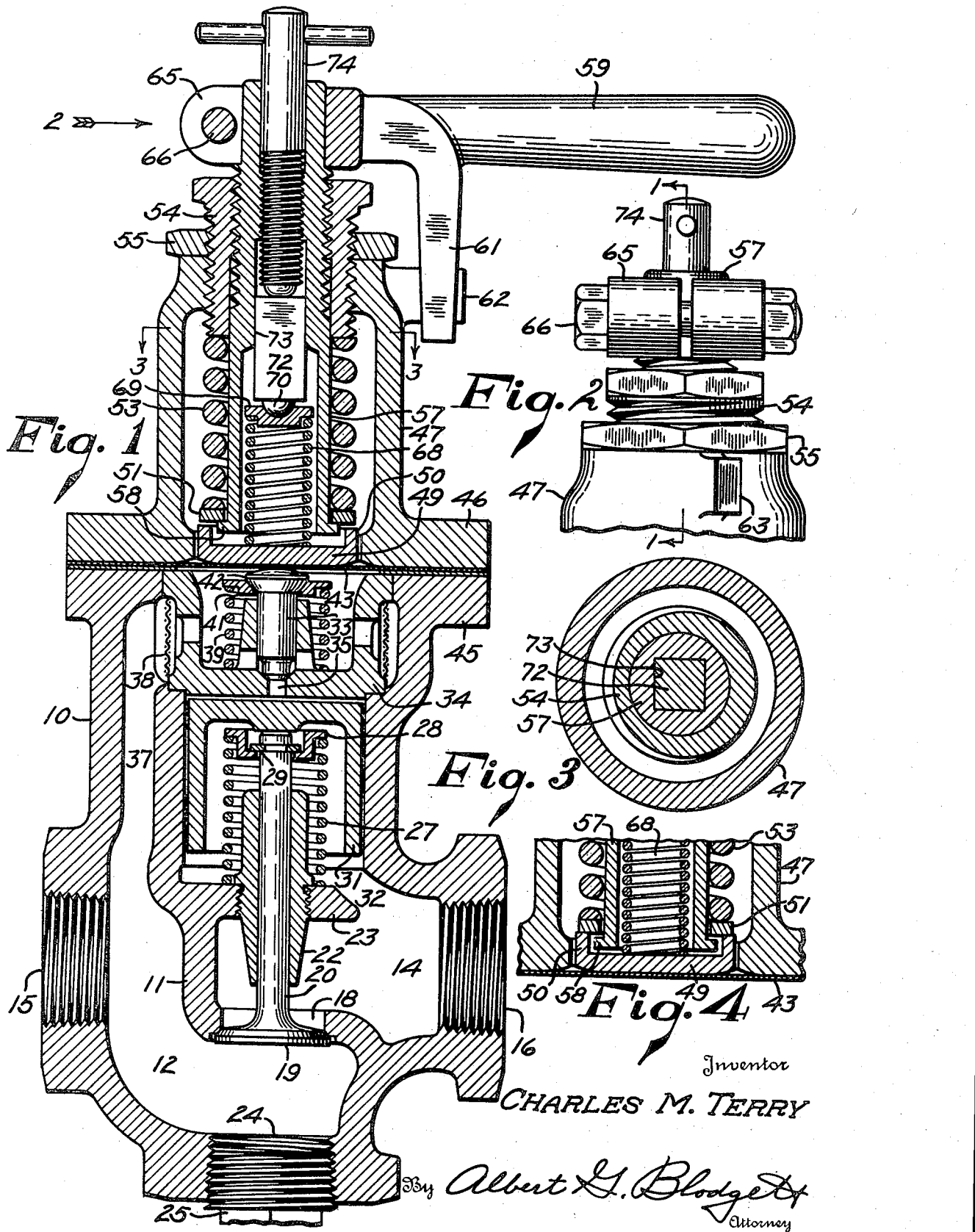

2,044,452

UNITED STATES PATENT OFFICE 2,044,452

ADJUSTABLE LOADING MEANS

Charles M. Terry, Decatur, Ill., assignor to A. W. Cash Company, Decatur, Ill., a corporation of Delaware Application April 1, 1935, Serial No. 13,999

12 Claims. (Cl. 137—153)

This invention relates to adjustable loading means, and more particularly to loading means for fluid pressure responsive devices, such as flexible diaphragms, which are often used for controlling valves in fluid-pressure regulators.

Regulators of this type are usually constructed to permit a manual adjustment of the fluid-pressure which is to be maintained, but ordinarily the adjustment covers a comparatively small range. Moreover, the usual manual adjustment requires considerable time and some experimentation to obtain the desired results.

In certain processes utilizing fluid under pressure, it is desirable to maintain a certain pressure during one step of the process and a different pressure during another step of the process. For example, in the manufacture of ice cream the mixture is first held at a temperature of about 5 degrees and stirred until it is frozen to a predetermined consistency, whereupon the temperature is increased to about 30 degrees and the mixture is whipped to reduce its specific gravity. Ammonia is ordinarily used as the refrigerant, and the temperature is controlled by regulating the pressure of the ammonia in the evaporator and maintaining said pressure at the desired value regardless of fluctuations which may take place in the pressure at the inlet of the compressor. Heretofore, it has been the practice to regulate the evaporator pressure during the freezing period only, and to shut off the evaporator suction line entirely during the whipping period, at which time the evaporator pressure increases to a point corresponding to the temperature of the ice cream mixture. It is highly desirable to control the evaporator pressure automatically during both the freezing period and the whipping period, but the ordinary fluid-pressure regulator is unsuitable for this purpose.

It is accordingly the main object of the invention to provide a comparatively simple and inexpensive loading means which can be quickly and accurately adjusted over a wide range.

It is a further object of the invention to provide a loading means having a simple adjustable device which makes possible a rapid shifting of the loading from a low value to a high value and vice versa.

It is a further object of the invention to provide a loading means suitable for use in a regulator for controlling the pressure in the evaporator of a refrigerating system and arranged to permit a rapid adjustment of the evaporator pressure between widely separated values.

With these and other objects in view, as will be apparent to those skilled in the art, the invention resides in the combination of parts set forth in the specification and covered by the claims appended hereto.

Referring to the drawing illustrating one embodiment of the invention, and in which like reference numerals indicate like parts, Fig. 1 is a section through a fluid-pressure regulator, the section being taken on the line 1—1 of Fig. 2;

Fig. 2 is an elevation of the upper portion of the regulator, viewed in the direction of the arrow 2 in Fig. 1;

Fig. 3 is a section on the line 3—3 of Fig. 1; and

Fig. 4 is a section similar to Fig. 1, showing a portion only of the regulator, and with the parts in a different position of adjustment.

In the drawing I have shown a fluid-pressure regulator particularly suitable for controlling the pressure in the evaporator of a refrigerating system. The embodiment illustrated comprises a hollow body or casing 10 divided internally by means of a partition wall 11 into an inlet chamber 12 and an outlet chamber 14. A screw-threaded inlet opening 15 leads to the chamber 12, and a screw-threaded outlet opening 16 leads from the chamber 14. The partition wall 11 is provided with a port 18, and the flow through this port is controlled by a valve 19 of the poppet type having an upwardly extending stem 20 which is slidably supported in a guide sleeve 22 screw-threaded to a wall 23 formed integral with the body 10. The valve 19 closes upwardly, in the direction of the flow through the port 18. For convenience in manufacture and assembly, a screw-threaded opening 24 is provided in the body 10 directly beneath the valve 19, this opening being closed by a threaded plug 25.

The valve 19 is urged upwardly toward closed position by a coiled compression spring 27 which surrounds the upper portion of the guide sleeve 22 and the valve stem 20. The lower end of the spring 27 rests against the wall 23, and the upper end of the spring engages an annular spring button 28 secured to the valve stem 20 by means of a suitable key 29.

In order to control the movements of the valve 19, I utilize a piston 31 which is slidably supported in the body 10 above the valve and engages the upper end of the valve stem 20. This piston is of hollow construction and its skirt extends downwardly around the outside of the valve spring 27. The space beneath the piston is in communication with the outlet chamber 14 through a passage 32.

Fluid under pressure is admitted from the inlet chamber 12 to the space above the piston 31 under control of an auxiliary valve 33 which is slidably supported in a valve cage 34 mounted in the body 10 directly above the piston. The cage 34 is formed with a port 35 which is closed by the valve 33 when in its lowermost position. A passage 37 leads from the inlet chamber 12 to the interior of the valve cage 34, and the cage is surrounded by a cylindrical screen 38 to protect the auxiliary valve 33 from foreign particles which may be present in the fluid. The valve 33 is urged upwardly toward open position by means of a coiled compression spring 39 having its lower end supported by the cage 34 and its upper end engaging an annular spring button 41 which engages an enlarged head 42 at the upper end of the valve. The head 42 contacts with the lower surface of a flexible horizontal diaphragm 43 which is clamped at its periphery between a flange 45 at the top of the body 10 and a flange 46 at the bottom of a hollow cylindrical spring chamber 47. The diaphragm 43 is subjected to the pressure of the fluid in the valve cage 34.

It will now be apparent that if the diaphragm 43 is loaded or supported against the fluid pressure by suitable means, and if the inlet 15 is connected to a source of fluid under pressure, such as the evaporator of a refrigerating system, the poppet valve 19 will be controlled in such a way as to maintain a substantially constant pressure in the inlet chamber 12. Under normal conditions the fluid pressure acting on the diaphragm will hold the auxiliary valve 33 open slightly, allowing a slight flow of fluid through the port 35 to create a pressure on the upper surface of the piston. This fluid will leak past the piston as fast as it is admitted through the port, and then escape through the passage 32 to the outlet 16. The pressure on the piston will be opposed by the spring 27 and by the unbalanced fluid pressure on the poppet valve 19. The poppet valve will be held open just far enough to maintain the desired pressure in the inlet chamber 12. Any change in the inlet chamber pressure will cause a movement of the auxiliary valve 33, varying the pressure on the piston 31, which will in turn readjust the poppet valve 19 in the proper direction to restore the desired inlet chamber pressure.

The present invention provides means whereby the diaphragm 43 is loaded to an extent which may be quickly and accurately adjusted over a considerable range. For this purpose a pressure plate 49 is mounted in contact with the upper surface of the diaphragm, and this plate is preferably formed with an upwardly extending annular flange 50 adapted to engage the lower surface of a ring 51 mounted thereabove. The ring 51 is urged downwardly by a comparatively heavy coiled compression spring 53 having its lower end in contact with the ring and its upper end supported by a sleeve 54 which is screw threaded externally to fit cooperating internal screw threads in the upper portion of the spring chamber 47. The spring chamber thus serves as a frame portion which supports the sleeve 54. By turning the sleeve it can be raised or lowered to vary the compression of the spring 53. A lock nut 55 is provided on the outside of the sleeve to hold it in a desired position of adjustment.

Means is provided to render the spring 53 ineffective as a loading element when it is desired to maintain a comparatively low pressure in the chamber 12. This is preferably brought about by means of a vertically adjustable device which when raised will support the lower end of the spring and prevent the transmission of force from the spring to the pressure plate 49. In the embodiment illustrated the sleeve 54 is screw-threaded internally to receive an externally screw-threaded sleeve 57 which extends downwardly through the center of the spring 53. The lower end of the inner sleeve 57 is provided with a flange or shoulder 58 which projects outwardly beneath a portion of the ring 51 and which fits within the annular flange 50 on the pressure plate. An operating handle 59 is secured to the upper end of the inner sleeve 57, and this handle is provided with a downwardly projecting lug 61. Stops 62 and 63 are provided on the spring chamber 47 in the path of the lug 61 to limit the movement of the handle 59. The various parts are so constructed and arranged that if the handle is turned to bring the lug against the stop 62, as shown in Fig. 1, the sleeve 57 will be raised and the flange 58 will lift the ring 51 out of contact with the flange 50. If the handle is turned to bring the lug against the stop 63, the sleeve 57 will be lowered as shown in Fig. 4 to allow the ring 51 to rest against the flange 50, thus rendering the spring 53 effective to load the diaphragm. In order to facilitate initial adjustment of the parts, the handle is provided with a split hub 65 which can be clamped against the upper portion of the sleeve 57 in any desired position about the axis of the sleeve by means of a bolt 66. The screw threads on the inside and outside of the outer sleeve 54 are preferably of the same pitch and the same hand, so that adjustment of the outer sleeve to vary the compression of the spring 53 will have no effect on the adjustment of the inner sleeve 57.

In order to provide a loading for the diaphragm 43 when the spring 53 has been rendered ineffective by manipulation of the handle 59, I preferably utilize a comparatively light coiled compression spring 68 located within the lower portion of the inner sleeve 57. The lower end of this spring rests upon the pressure plate 49, and its upper end is supported by a spring button 69 which engages a spherically-surfaced protuberance 70 on the lower end of a vertical bar 72. This bar 72 is of square or otherwise non-circular cross-section, and it is vertically slidable in a similarly shaped bore 73 in the interior of the sleeve 57. The upper end of the bar 72 engages the lower end of a manually-adjustable screw 74 screw-threaded to the interior of the sleeve 57.

The operation of the invention will now be apparent from the above disclosure. The diaphragm 43 will move vertically in response to any variations in the fluid pressure in the inlet chamber 12, and as the diaphragm moves the auxiliary valve 33 will likewise move and vary the pressure above the piston 31. This will cause the piston to move and readjust the main valve 19. As a result, a substantially constant pressure will be maintained in the inlet chamber 12 so long as the loading of the diaphragm remains unchanged. With the handle 59 turned to bring the lug 61 against the stop 62, the sleeve 57 will be in its upper position and the flange 58 will hold the ring 51 out of contact with the flange 50. Under these conditions the diaphragm will be loaded by the inner spring 68, which can be adjusted as desired by turning the screw 74. If now the handle is turned to bring the lug 61 against the stop 63, the sleeve 57 will be in its lower position and the ring 51 will engage the flange 50. Under these conditions the diaphragm will be loaded by both the springs 53 and 68, and the fluid pressure in the chamber 12 will be maintained at a considerably higher value. This pressure can be adjusted by turning the outer sleeve 54 and thus varying the compression of the outer spring 53. The non-circular bar 72 prevents the transmission of torque from the inner spring 68 to the screw 74, so that this screw will remain in a given position of adjustment despite frequent oscillations of the handle 59 and sleeve 57.

The regulator is particularly suitable for controlling the pressure in the evaporator of a refrigerating system used for manufacturing ice cream, and a simple movement of the handle 59 is all that is required to vary the pressure from that required during the freezing period to that required during the whipping period and vice versa. Moreover, either of these pressures can be independently adjusted in a very simple manner.

In the description and claims I have used such expressions as "vertical", "horizontal", "upper", "lower", etc., but it will be understood that these expressions are used merely to describe the relative positions of the various parts, for it is obvious that the regulator will operate in positions other than that illustrated.

Having thus described my invention, what I claim as new and desire to secure by Letters Patent is:

1. An adjustable loading means for a fluid pressure responsive device comprising two concentric coiled compression springs mounted above the device with their common axis vertical, said springs being arranged to provide a downward force for loading the device, a frame portion extending above the outer spring, a sleeve mounted in the frame portion and forming a vertically adjustable support for the upper end of the outer spring, a vertical element extending downwardly through the sleeve and screw-threaded to the interior of the sleeve, and means to turn said element about its axis and move it between an upper and a lower position, said element when in its upper position serving to support the lower end of one of the springs and prevent transmission of force from the said spring to the device.

2. An adjustable loading means for a fluid pressure responsive device comprising two concentric coiled compression springs mounted above the device with their common axis vertical, said springs being arranged to provide a downward force for loading the device, a frame portion extending above the outer spring, a sleeve screw-threaded externally to the frame portion and arranged to serve as a vertically adjustable support for the upper end of the outer spring, said sleeve having internal screw threads of the same pitch and hand as the external screw threads, a vertical element extending downwardly through the sleeve and provided with external screw threads which engage the internal screw threads on the sleeve, and means to turn said element about its axis and move it between an upper and a lower position, said element when in its upper position serving to support the lower end of one of the springs and prevent transmission of force from the said spring to the device.

3. An adjustable loading means for a fluid pressure responsive device comprising an outer coiled compression spring mounted above the device with its axis vertical, said spring being arranged to provide a downward force for loading the device, a frame portion extending above the spring, a sleeve screw-threaded externally to the frame portion and arranged to serve as a vertically adjustable support for the upper end of the spring, said sleeve having internal screw threads of the same pitch and hand as the external screw threads, a vertical element extending downwardly through the sleeve and provided with external screw threads which engage the internal screw threads on the sleeve, said element being hollow at its lower end, an inner coiled compression spring mounted within the hollow portion of the vertical element and arranged to provide an additional downward force for loading the device, and means to turn the vertical element about its axis and move it between an upper and a lower position, said element when in its upper position serving to support the lower end of the outer spring and prevent transmission of force therefrom to the device.

4. An adjustable loading means for a fluid pressure responsive device comprising an outer coiled compression spring mounted above the device with its axis vertical, said spring being arranged to provide a downward force for loading the device, means located above the spring to form a support for the upper end thereof and shaped to provide an opening coaxial with the spring, a vertical element extending downwardly through the opening and shaped to provide a recess in its lower portion, an inner coiled compression spring mounted within the recess and arranged to provide an additional downward force for loading the device, and means to move the element between an upper and a lower position, the element being shaped to provide a shoulder arranged to support the lower end of one of the springs when the element is in its upper position.

5. An adjustable loading means for a fluid pressure responsive device comprising an outer coiled compression spring mounted above the device with its axis vertical, said spring being arranged to provide a downward force for loading the device, means located above the spring to form a support for the upper end thereof and shaped to provide an opening coaxial with the spring, a vertical sleeve extending downwardly through the opening, an inner coiled compression spring mounted within the lower portion of the sleeve and arranged to provide an additional downward force for loading the device, vertically adjustable means extending downwardly through the upper portion of the sleeve to form a support for the upper end of the inner spring, and means to move the sleeve between an upper and a lower position, the sleeve being shaped to provide a shoulder arranged to support the lower end of one of the springs when the sleeve is in its upper position.

6. An adjustable loading means for a fluid pressure responsive device comprising an outer coiled compression spring mounted above the device with its axis vertical, said spring being arranged to provide a downward force for loading the device, means located above the spring to form a support for the upper end thereof and shaped to provide an internally screw-threaded opening coaxial with the spring, a vertical sleeve extending downwardly through the opening and provided with external screw threads which engage the internal screw threads in the opening, an inner coiled compression spring mounted within the lower portion of the sleeve and arranged to provide an additional downward force for loading the device, vertically adjustable means extending downwardly through the upper portion of the sleeve to form a support for the upper end of the inner spring, and means to turn the sleeve about its axis and move it between an upper and a lower position, the sleeve being shaped to provide a shoulder arranged to support the lower end of the outer spring when the sleeve is in its upper position and thus prevent transmission of force from the outer spring to the device.

7. An adjustable loading means for a fluid pressure responsive device comprising an outer coiled compression spring mounted above the device with its axis vertical, said spring being arranged to provide a downward force for loading the device, means located above the spring to form a support for the upper end thereof and shaped to provide an internally screw-threaded opening coaxial with the spring, a vertical sleeve extending downwardly through the opening and provided with external screw threads which engage the internal screw threads in the opening, an inner coiled compression spring mounted within the lower portion of the sleeve and arranged to provide an additional downward force for loading the device, a bar mounted within the sleeve to support the upper end of the inner spring, said bar being adjustable vertically but not rotatably relative to the sleeve, and means to turn the sleeve about its axis and move it between an upper and a lower position, the sleeve being shaped to provide a shoulder arranged to support the lower end of one of the springs when the sleeve is in its upper position and thus prevent transmission of force from said spring to the device.

8. An adjustable loading means for a fluid pressure responsive device comprising an outer coiled compression spring mounted above the device with its axis vertical, said spring being arranged to provide a downward force for loading the device, means located above the spring to form a support for the upper end thereof and shaped to provide an internally screw-threaded opening coaxial with the spring, a vertical sleeve extending downwardly through the opening and provided with external screw threads which engage the internal screw threads in the opening, an inner coiled compression spring mounted within the lower portion of the sleeve and arranged to provide an additional downward force for loading the device, a bar of non-circular cross-section slidable vertically in a similarly shaped bore in the sleeve, said bar serving to support the upper end of the inner spring, a manually adjustable screw mounted in the sleeve to support the upper end of the bar, and means to turn the sleeve about its axis and move it between an upper and a lower position, the sleeve being shaped to provide a shoulder arranged to support the lower end of one of the springs when the sleeve is in its upper position and thus prevent transmission of force from said spring to the device.

9. An adjustable loading means for a fluid pressure responsive diaphragm comprising a spring chamber above the diaphragm, a pressure plate engaging the upper surface of the diaphragm and shaped to provide an upwardly projecting annular flange, means including an outer vertical coiled compression spring mounted above the flange to exert pressure downwardly thereon, the spring chamber having an opening above the spring, a vertically adjustable outer sleeve mounted in the opening to support the upper end of the spring, an inner sleeve extending downwardly through the outer sleeve and the spring, the inner sleeve having an outwardly projecting flange at its lower end located within the annular flange, means to adjust the inner sleeve between an upper and a lower position, the outwardly projecting flange serving to support the lower end of the spring when the inner sleeve is in its upper position and prevent transmission of force therefrom to the upwardly projecting flange, an inner vertical coiled compression spring mounted within the the lower portion of the inner sleeve with its lower end engaging the pressure plate, and a vertically adjustable bar mounted in the inner sleeve to support the upper end of the inner spring.

10. An adjustable loading means for a fluid pressure responsive diaphragm comprising a spring chamber above the diaphragm, a pressure plate engaging the upper surface of the diaphragm and shaped to provide an upwardly projecting annular flange, means including an outer vertical coiled compression spring mounted above the flange to exert pressure downwardly thereon, the spring chamber having a screw-threaded opening above the spring, an outer sleeve screw-threaded externally and mounted in the opening to support the upper end of the spring, the sleeve also having internal screw threads, an inner sleeve extending downwardly through the outer sleeve and the spring, the inner sleeve having external screw threads to fit the internal threads in the outer sleeve, the inner sleeve having an outwardly projecting flange at its lower end located within the annular flange, a handle attached to the upper end of the inner sleeve whereby the inner sleeve may be turned about its axis and moved between an upper and a lower position, stops on the spring chamber to limit the movements of the handle, the outwardly projecting flange serving to support the lower end of the spring when the inner sleeve is in its upper position and prevent transmission of force therefrom to the upwardly projecting flange, an inner vertical coiled compression spring mounted within the lower portion of the inner sleeve with its lower end engaging the pressure plate, and a vertically adjustable bar mounted in the inner sleeve to support the upper end of the inner spring.

11. An adjustable loading means as covered by claim 10, in which the screw threads on the inside and outside of the outer sleeve are of the same hand and pitch.

12. An adjustable loading means as covered by claim 10, in which means is provided to secure the handle to the inner sleeve in any desired position about the axis of the sleeve.

CHARLES M. TERRY.